United States Patent [19]

Andersson

[11] Patent Number: 4,679,972
[45] Date of Patent: Jul. 14, 1987

[54] DEVICE IN ROTARY TOOLS

[75] Inventor: Kjell Andersson, Fagersta, Sweden

[73] Assignee: Seco Tools AB, Fagersta, Sweden

[21] Appl. No.: 526,078

[22] Filed: Aug. 24, 1983

[30] Foreign Application Priority Data

Nov. 12, 1982 [SE] Sweden .................. 8206434

[51] Int. Cl.$^4$ ............................................ B23B 39/00
[52] U.S. Cl. .................... 408/150; 408/151;
 408/178
[58] Field of Search ............... 408/150, 239, 199, 147,
 408/152, 153, 178, 173, 146, 198, 177, 181, 183,
 151

[56] References Cited

U.S. PATENT DOCUMENTS

| 2,991,667 | 11/1961 | Williams . | |
|---|---|---|---|
| 3,000,240 | 9/1961 | Eckardt | 408/151 |
| 3,125,903 | 3/1964 | Briney, Sr. et al. | 408/151 |
| 3,689,169 | 9/1972 | Gersch | 408/150 |
| 4,014,439 | 3/1977 | Kochsiek et al. | 408/151 X |
| 4,053,252 | 10/1977 | Gersch | 408/150 |
| 4,439,074 | 3/1984 | Kalokhe | 408/150 X |

FOREIGN PATENT DOCUMENTS 475221 10/1975 U.S.S.R. .................. 408/150

*Primary Examiner*—Gil Weidenfeld
*Assistant Examiner*—Glenn L. Webb
*Attorney, Agent, or Firm*—Burns, Doane, Swecker & Mathis

[57] ABSTRACT

The invention relates to rotary cutting tools (10) provided with cutting means and mounted in a tool holder (11). A sleeve (17) provided with an eccentric bore is rotatably positioned between the tool holder (11) and the cutting tool (10) for radial adjustment of the cutting means. For purposes of making possible use of cutting tools having center cutting means the sleeve (17) is rotatable relative to the tool holder (11) about an axis (18) which is radially spaced from the rotational axis (21) of the cutting tool (10).

8 Claims, 5 Drawing Figures

DEVICE IN ROTARY TOOLS

BACKGROUND AND OBJECTS OF THE INVENTION

The present invention relates to a device for radial adjustment of a cutting insert in rotary cutting tools for chipforming machining of preferably metallic workpieces, wherein the cutting insert is provided on a tool element, such as a drill or a shank end mill, which is mounted in a tool holder, comprising a sleeve member which is arranged rotatably between the tool holder and the tool element, said sleeve member being rotatable relative to the tool holder about a first axis and relative to the tool element about a second axis, said second axis being radially spaced from said first axis, thereby causing the tool element and thus also the cutting insert to be displaced radially relative to the tool holder upon rotation of the sleeve member relative to the tool element and the tool holder.

A device of this type is disclosed in U.S. Pat. No. 2,991,667. This prior art device is intended for reaming pre-drilled holes and cannot be used in connection with tools having centre inserts, i.e. tools in which the cutting edges of the inserts extend from the rotational axis of the cutting tool, since the sleeve member is rotatable relative to the tool holder about an axis which coincides with the rotational axis of the cutting tool.

The object of the present invention is to provide a device of the above type in which cutting tools having centre inserts can be radially displaced without jeopardizing the function of the cutting tool.

Another object of the invention is to provide a radial adjustment of the cutting insert as accurate as possible.

A further object of the invention is to provide a device in which the length of the tool holder is no larger than that of tool holders for tool elements which do not allow radial adjustment of the cutting insert.

A still further object of the invention is to provide a device in which the unbalanced forces created by radial adjustment of the cutting insert are as small as possible.

The above and other objects are attained by giving the invention the characterizing features stated in the appending claims.

THE DRAWINGS

The invention is described in detail in the following description with reference to the accompanying drawings in which one embodiment is shown by way of example. It is to be understood that this embodiment is only illustrative of the invention and that various modifications thereof may be made within the scope of the claims.

DETAILED DESCRIPTION OF A PREFERRED EMBODIMENT OF THE INVENTION

Figure 1:
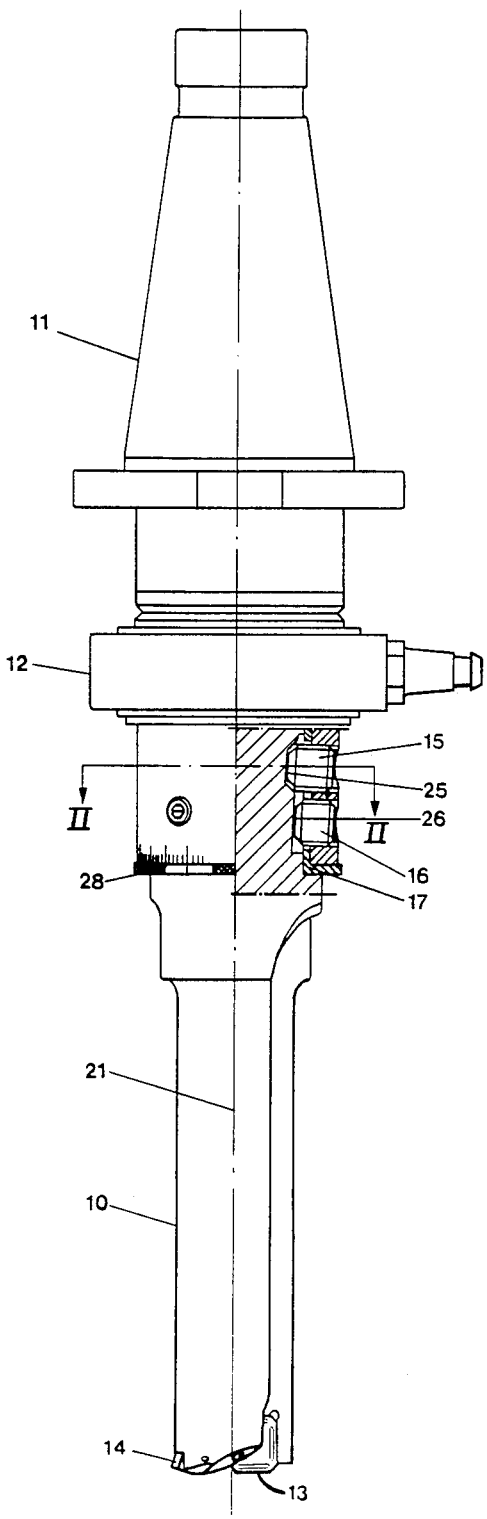
FIG. 1 shows, partly in section, a side view of a device according to the invention.

In FIG. 1 a tool element 10 in form of a short hole drill is shown, which is mounted in a tool holder 11. The tool holder 11 is in conventional manner intended to be mounted in a conical bore in a machine spindle, not shown. A swivel 12 is mounted on the tool holder 11 for supplying cooling and flushing fluid to the drill 10.

In the illustrated embodiment the swivel 12 is of the type described in U.S. Pat. No. 4,293,251.

The drill 10 is provided with a radially inner cutting insert 13 and a radially outer cutting insert 14. In FIGS. 2-5 the position of the insert 13 is diagrammatically illustrated. The drill 10 is in conventional manner secured to the tool holder 11 by means of screws 15, 16 which rest against planar surfaces 25, 26 on a bevelled portion of the drill 10. According to the invention a sleeve member 17 is rotatably mounted between the tool holder 11 and the drill 10. The sleeve member 17 is rotatable relative to the tool holder 11 about an axis 18 and relative to the drill 10 about an axis 19. The axis 19 is radially spaced from the axis 18. Preferably, the axis 19 coincides with the rotational axis 21 of the drill 10 in one rotational position of the sleeve member 17. In the illustrated embodiment the axes 19 and 21 coincide when the sleeve member 17 is set such that the drill 10 drills a hole having nominal diameter. The sleeve member 17, thus, has mutually eccentric inner and outer surfaces and is outwardly, i.e. along its outer surface, rotatable about the axis 18 and inwardly, i.e. along its inner surface, rotatable about the axis 19. As shown in FIGS. 2-5, the axis 19 is located in front of the axis 18, when seen in the cutting direction of the cutting insert 13, and the axis 18 is located radially outwardly of the axis 19 with respect to the rotational axis 21.

Figure 2:
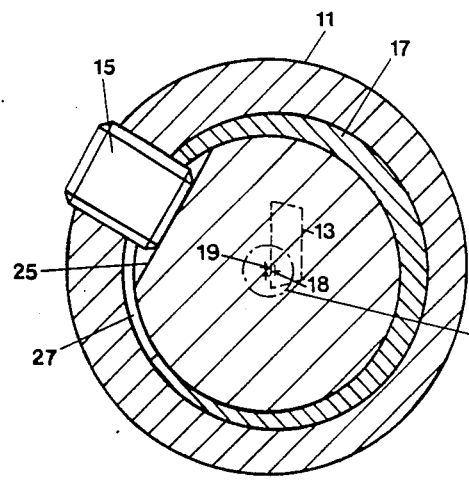
FIG. 2 shows a section taken on the line II—II in FIG. 1; the cutting inserts of the rotary cutting tool being in a radially outer position.
Figure 3:
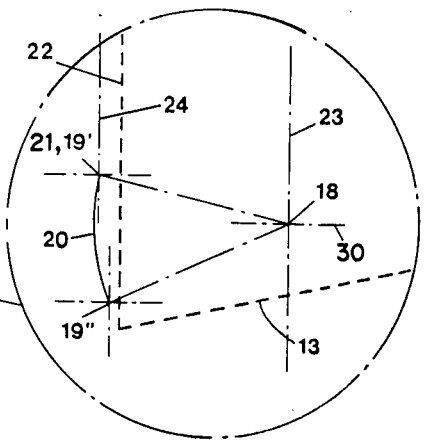
FIG. 3 shows on an enlarged scale the encircled portion in FIG. 2.
Figure 4:
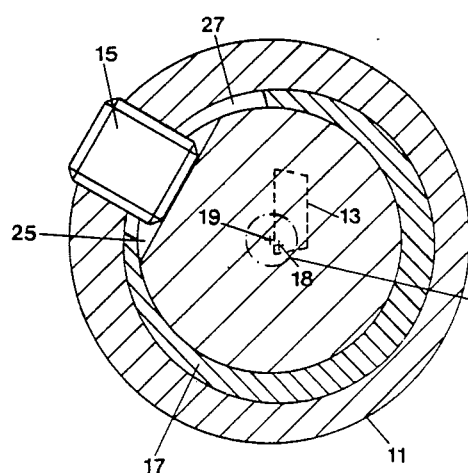
FIG. 4 shows a section taken on the line II—II in FIG. 1; the cutting inserts being in a radially inner position.
Figure 5:
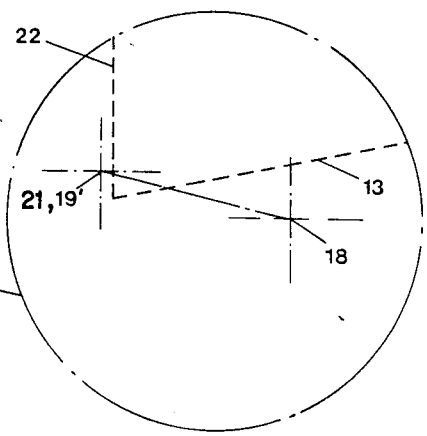
FIG. 5 shows on an enlarged scale the encircled portion in FIG. 2.

If the sleeve member 17 is rotated in clockwise direction from the position shown in FIG. 2 to the position shown in FIG. 4 then the insert 13 and the outer insert 14 (not shown) will be moved from the radially outer position shown in FIG. 3 to the radially inner position shown in FIG. 5. It is to be understood that the radially outer position relates to a position of the inserts in which larger hole diameter is obtained than in the radially inner position. In similar manner, in the following, movement radially inwards of the insert relates to an adjustment for decreasing the hole diameter.

Since the hole diameter is defined by the outer insert 14 and the inner and outer inserts 13, 14 are located on opposite sides of the axis 19 the insert 13 extends further radially outwards in the above-defined radially inner position than in the radially outer position. The above movement of the inserts is illustrated in FIG. 3 which shows how the axis 19 moves along an arc 20 having the axis 18 at its centre from the position 19' to the position 19"; the axis 19 being fixed relative to the drill 10. If the drill 10 did follow the rotation of the sleeve member 17 then all points on the cutting edge 22 of the insert 13 would move along arcs parallel with the arc 20 upon rotation of the sleeve member 17. The direction of the cutting edge 22, however, shall be maintained unchanged when the rotation of the sleeve member 17 is terminated. In order to maintain the direction of the cutting edge 22 the drill 10, and thus its inserts, shall be rotated in counter clockwise direction about the axis 19. The maintenance of an unchanged direction of the cutting edge 22 upon terminated rotation of the sleeve member 17 is ensured by means of the screws 15, 16.

Practically, before rotating the sleeve A the screws 15, 16 are loosened so that the drill 10 can be maintained in an unchanged rotational position during the adjustment of the bore diameter.

According to the invention the eccentricity of the sleeve member 17 is disposed in such a way relative to the axes 19, 21, i.e. the axes 18, 19, 21 are mutually located in such a way, that the cutting edge 22 is more remote from a plane 23, which passes through the axis 18 and which is parallel with the cutting edge 22, in an intermediate position than in its radially outermost and innermost positions when the insert 13 upon rotation of the sleeve member 17 is moved from its radially outermost position, compare FIG. 3, to its radially innermost position, compare FIG. 5. This means that the two positions 19', 19'' of the axis 19 are located at different sides of a plane 30 extending through the axis 18 and being perpendicular to the plane 23.

In rotary cutting tools having an insert located at the rotational axis thereof the cutting edge of this insert is normally disposed somewhat behind, when seen in the rotational direction, a plane which extends through the rotational axis and is parallel with the cutting edge. In short hole drills, thus, the radially inner insert 13 is usually located in such a way that its cutting edge 22 is disposed behind a plane 24 which extends through the rotational axis 21 in parallelism with the cutting edge 22, when seen in the rotational direction of the drill. When the sleeve member 17 is rotated in clockwise direction in FIG. 2 the cutting edge 22, if being parallel displaced, will first get nearer to the plane 24 and then go away from this plane. Due to the fact that the displacement of the cutting edge 22 toward the plane 24 is small, in the order of 0.03 mm, and since the cutting edge 22 is disposed behind the plane 24 about 0.1 mm, the cutting edge 22 will constantly be located between the plane 23 and the plane 24 when the insert 13 is moved from its radially outermost to its radially innermost position. When the cutting inserts 13, 14 have been moved radially inwards a distance in the order of say 1.4 mm from their position at nominal drilling diameter then the cutting edge 22 is at the same distance from the plane 24 as when the inserts are at the said nominal position. The inserts 13, 14 can be moved further radially inwards—the total movement being in the order of 2 mm—without jeopardizing the function of the drill. The cutting edge 22 can also be moved radially outwards in the order of 0.4 mm from its position at nominal drilling diameter.

For purposes of limiting the rotation of the sleeve member 17 the latter is provided with a slot. The opposed end surfaces of this slot provide stop means for the rotation of the sleeve member 17 by cooperation with a stop member in form of the screw 15.

In a device according to the invention the generated unbalanced forces are small, since only the drill 10 and thus not the sleeve member 17, is displaced relative to the rotational axis of the drill. The tool holder 11 and a radial flange 28 on the sleeve member 17 are provided with indicating means for indication of mutual rotational position. According to the invention it is possible to adjust the diameter of the drill with an accuracy of ±0.02 mm. Further, the overall length of the tool holder 11 does not need to be larger than the length of corresponding tool holders for drills which are not radially adjustable.

In the foregoing the invention is shown applied on a short hole drill. However, the invention can of course be applied on other types of rotary cutting tools, for instance drilling shank end mills. Further, the invention can be used in connection with different types of tool holders, for instance holders in form of an adapter which is secured to an arbor which in its turn is connected to the machine spindle.

I claim:

1. A rotary cutting tool such as a drill or shank end mill, comprising:
    a tool holder rotatable about a first axis,
    a sleeve carried by said tool holder and rotatable relative thereto about a second axis,
    a tool element including generally radially disposed cutting edge means having a radially inner end situated immediately adjacent said first axis, said tool element mounted in said sleeve such that said sleeve is rotatable relative to said tool element about a third axis spaced from, and disposed parallel to, said second axis such that rotation of
    said sleeve displaces said third axis relative to said first and second axes along an arcuate path of adjustment to vary the size of a hole being cut by said cutting edge means,
    said sleeve being arranged such that said second axis is spaced from, and disposed parallel to, said first axis to minimize the distance by which said inner end of said cutting edge means becomes spaced from said first axis during travel of said third axis along said path of adjustment,
    a stop member extending between said holder and said tool element for maintaining a constant rotational position of said tool element with respect to said holder following a rotation of said sleeve, and
    said third axis being movable along said path of adjustment between a maximum diameter cutting position and a minimum diameter cutting position of said cutting edge means, said inner end of said cutting edge means being spaced farther from said second axis when said third axis is disposed intermediate said maximum and minimum diameter cutting positions than when said third axis is at either of said cutting positions.

2. A rotary cutting tool according to claim 1, wherein said third axis coincides with said first axis at one position along said path of adjustment when said cutting edge means is arranged for cutting a minimum diameter.

3. A rotary cutting tool according to claim 1, wherein said sleeve has inner and outer cylindrical surfaces, said sleeve being rotatable about said second axis along said outer surface and about said third axis along said inner surface.

4. A rotary cutting tool according to claim 1, wherein said inner end of said cutting edge means is constantly disposed between a first imaginary plane passing through said second axis parallel to said inner portion of said cutting edge, and a second imaginary plane passing through said third axis parallel to said first plane, in all positions of said third axis along said path of adjustment.

5. A rotary cutting tool according to claim 1, wherein said sleeve includes a slot, said stop member being attached to said holder and projecting into said slot to limit movement of said sleeve between a maximum diameter cutting position and a minimum diameter cutting position.

6. A rotary cutting tool according to claim 5, wherein said stop member comprises a screw threadedly connected to said holder, said screw including a planar face engageable with a planar face of said tool element.

7. A rotary cutting tool according to claim 1, including radially inner and outer cutting inserts mounted on said tool element, each said insert including a cutting edge, said cutting edges together defining said cutting edge means, and said cutting edge of said inner insert defining said inner end of said cutting edge means.

8. A rotary cutting tool according to claim 1, wherein said stop member is supported by one of said holder and said tool element and is engageable with the other of said holder and said tool element.

* * * * *